R. O. STUTSMAN.
CORN POPPER.
APPLICATION FILED MAY 2, 1910.
1,078,521.
Patented Nov. 11, 1913.
3 SHEETS—SHEET 3.
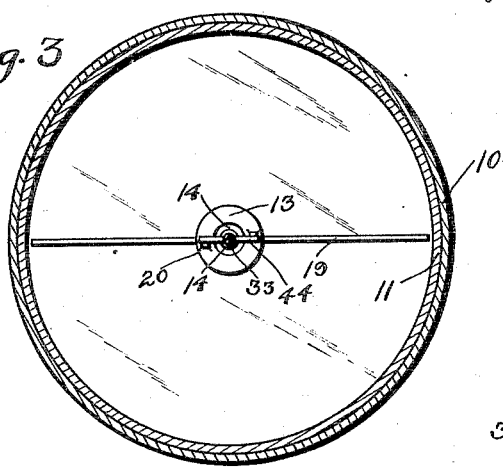
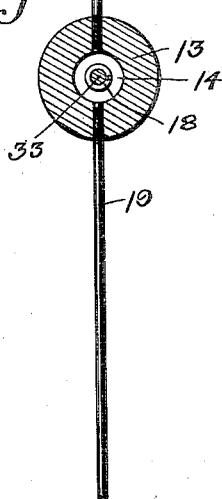
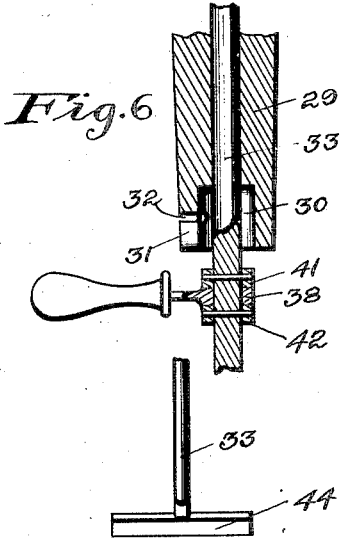
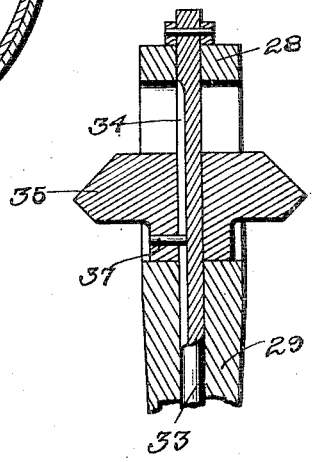
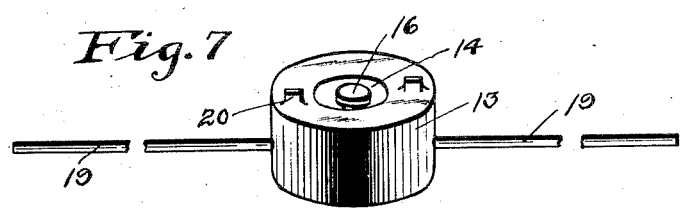
Witnesses
F. C. Caswell
W. A. Loftus.
Inventor
R. O. Stutsman
by J. Ralph Orwig Atty.

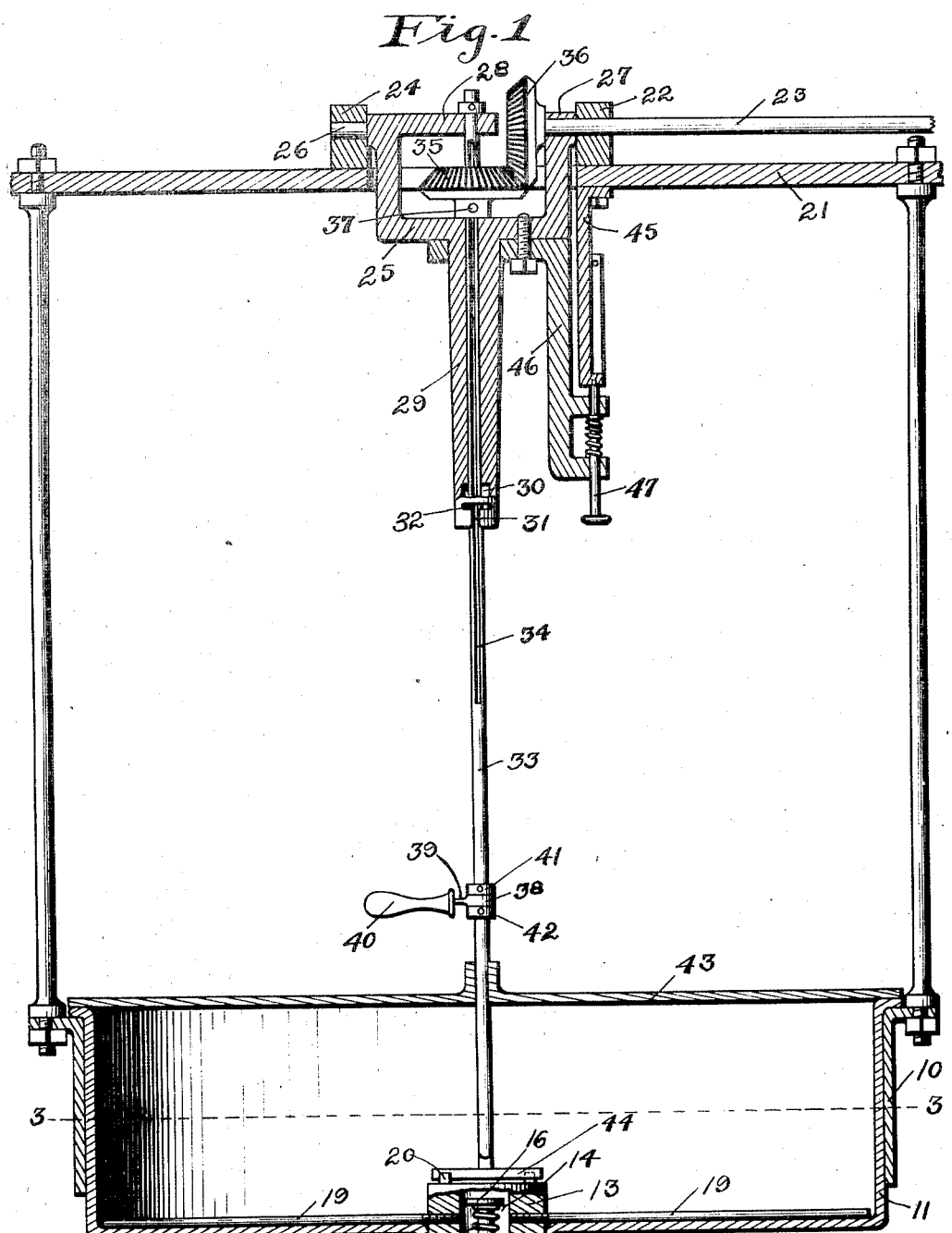

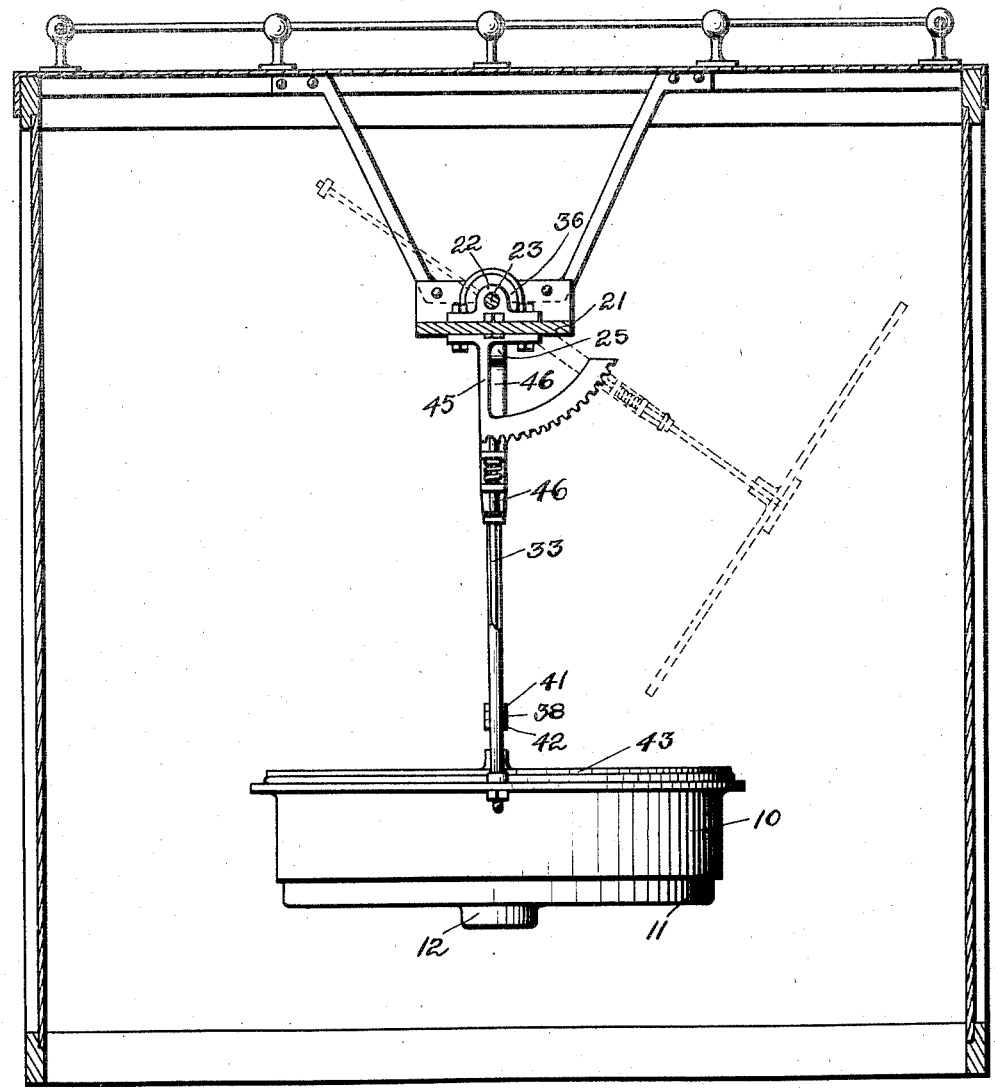

UNITED STATES PATENT OFFICE.

REUBEN O. STUTSMAN, OF DES MOINES, IOWA.

CORN-POPPER.

1,078,521.   Specification of Letters Patent.   Patented Nov. 11, 1913.

Application filed May 2, 1910. Serial No. 558,941.

*To all whom it may concern:*

Be it known that I, REUBEN O. STUTSMAN, a citizen of the United States, residing at Des Moines, in the county of Polk and State of Iowa, have invented a certain new and useful Corn-Popper, of which the following is a specification.

My invention relates to that class of corn poppers in which the corn to be popped is placed in a suitable pan and a stirrer is provided to be automatically actuated by applied power for constantly moving the corn that is in direct contact with the pan to prevent it from becoming burned.

My object is to provide simple, durable and inexpensive means, whereby the power shaft and the cover of the pan may be jointly elevated to a point above the pan so that the pan may be removed and its contents discharged and at the same time to provide a stirrer in which the stirrer arms remain in the pan when the shaft and the cover are elevated.

A further object is to provide means whereby the stirrer operating shaft may be elevated and also swung laterally to position where the cover will not interfere with the removal of the pan and will also be in position where the heat arising from the burner that heats the pan will not strike upon the cover when in its raised position.

My invention consists in certain details, in the construction, arrangement and combination of the various parts of the device, whereby the objects contemplated are attained, as hereinafter more fully set forth, pointed out in my claims and illustrated in the accompanying drawings, in which:

Figure 1 shows a vertical, sectional view of a complete corn popper embodying my invention. Fig. 2 shows a side elevation of same. The dotted lines therein indicate the position of the stirrer shaft and the cover when swung to one side to permit the removal of the pan and to be away from the heat arising from the burner beneath the pan. Fig. 3 shows a sectional view on the line 3—3 of Fig. 1 and on a reduced scale. Fig. 4 shows a horizontal, sectional view of the stirrer. Fig. 5 shows an enlarged, detail, sectional view of the sliding beveled gear on the stirrer shaft. Fig. 6 shows a detail, sectional view of the lower end of the supporting bearing for the stirrer shaft to illustrate the means for supporting the stirrer shaft in an elevated position, and Fig. 7 shows a detail, perspective view illustrating the cross bar at the lower end of the stirring shaft and the stirrer adjacent thereto to illustrate the lugs on the stirrer to receive said cross bar.

Referring to the accompanying drawings, I have used the reference numeral 10 to indicate a circular frame designed to receive a circular metal pan 11 in which the corn to be popped is placed. At the central portion of the bottom of the pan is a depression 12 in which is rotatably mounted a stirrer block 13 which is made circular to fit the depression 12. The central portion of this block is provided with a recess 14 and a bolt 15 extends upwardly through the bottom of the pan 12 and through the block 13 into the recess 14 and is provided with a head 16 at its upper end and it is also provided with a nut 17 at its lower end below the pan. Mounted within the recess 14 is an extensible coil spring 18 bearing against the head 16 and against the block 13 at the bottom of the recess 14 to thereby yieldingly hold the block in position against the bottom of the pan at the depression 12. Fixed to the stirrer block are a number of stirrer arms 19 which extend straight outwardly in position to engage and rest upon the bottom of the pan 11 so that when the block 13 is rotated said arms will traverse the bottom of the pan and prevent grains of corn from sticking to it and becoming burned. These arms 19 are preferably made of flexible wire so that they may readily and easily conform to the irregular surface at the bottom of the pan and the spring 18 permits the said block 13 to yield sufficiently to prevent the arms 19 from binding upon the bottom of the pan. On top of the block 13 are two lugs or projections 20 for purposes hereinafter made clear.

Above the frame member 10 is a supporting frame member 21 having a bearing 22 thereon to receive a horizontally arranged shaft 23, which shaft may be rotated by applied power in any ordinary way. In line with this bearing 22 is a bearing 24 designed to receive a pivoted bracket 25 designed to swing in a vertical plane, one arm of which is provided with a journal 26 inserted in the bearing 24 and the other arm of which has a bearing 27 mounted on the shaft 23. The said bracket is also provided with an arm 28 having a vertical opening through it for purposes hereinafter made clear. At the bottom of the bracket 25 is a tubular bearing 29 having its lower end provided with a circular recess 30 and a vertical slot 31 at one side of the recess and a horizontal slot 32 at the top of the vertical slot. Mounted within the bearing 29 is the stirrer shaft 33 having a longitudinally arranged groove 34. Said shaft projects upwardly through the arm 28 and mounted on the shaft between the arm 28 and the bottom of the bracket 25 is a beveled pinion 35 in mesh with a beveled pinion 36 on the shaft 23. The said beveled pinion 35 is provided with a pin 37 inserted in the groove 34 so that the said shaft 33 may freely move vertically without moving the beveled pinion 35. Rotatably mounted on the shaft 33 is a collar 38 having an arm 39 extending outwardly from it and provided with a handle 40. Above and below the collar 38 are the collars 41 and 42 fixed to the shaft. These parts are so arranged that the operator may grasp the handle 40 and elevate it together with the shaft 33 to bring the arm 39 upwardly to the top of the slot 30. Then by turning the handle 40 to one side the arm 39 will rest in the slot 32 and thus support the shaft in its elevated position. Slidingly mounted upon the lower end portion of the shaft is a cover 43, the edges of which are designed to rest on top of the pan 11, and on the bottom of the shaft 33 is a cross bar 44 designed to engage the lugs 20 when the shaft is at its lower limit of movement and to readily disengage therefrom when the shaft is elevated.

I have provided means for supporting the shaft 33 when it is swung with the bracket 25 toward one side as follows: Fixed to the support 21 is a sector 45 having a series of notches therein. Fixed to the bracket 25 is an arm 46 having a spring actuated slide bolt 47 mounted therein to engage the sector and to enter the notches thereof. When the shaft 33 is in an upright position the slide bolt 47 will enter one of the notches in the sector 45 and hold the shaft firmly in position. However when the operator grasps the shaft or the handle 40 he may first elevate the shaft and support it in its elevated position and then may swing the shaft and the bracket 25 to one side, as clearly shown in Fig. 2, and the said slide bolt will enter a notch on the opposite end of the sector and thus support the shaft and the cover in the position shown by dotted lines in Fig. 2.

In practical use, it is desirable that the stirrer wires be made small and flexible to yieldingly press against the bottom of the pan. It is also desirable that these wires remain in position within the pan when the cover is removed and when the pan is removed to have its contents discharged for the reason that when the pan is partially filled with corn or other material, it is difficult to place the stirrer wires in position on the bottom of the pan. It is also desirable that the cover 43 be so arranged that it may freely move upwardly so that the pressure of the popped corn within the pan may raise it when the pan becomes filled with corn. Assuming that the cover is placed in the position shown by dotted lines in Fig. 2, the operator may readily and easily place a pan in position within the frame 10 having the stirrer in the bottom of the pan and he may then place corn or other material therein. Then the operator grasps the handle 40 and moves the shaft 33 to an upright position and then lowers it, whereupon the cross bar 44 will engage with the lugs 20; then when the shaft 23 is rotated in any ordinary way the shaft 33 will also be rotated and the stirrer will move with it within the pan. The operator may, from time to time, examine the contents of the pan by grasping the handle 40 and elevating it to position where the cross bar 44 will engage the cover and raise it; then when it is desired to remove the contents of the pan the handle 40 is placed in position with the arm 39 within the slot 32 and then the pan may be removed and its contents discharged. The block 13 will remain in engagement with the pan at all times even when the pan is inverted. The advantage of having the shaft 33 capable of swinging laterally and being supported at one side is that when thus supported the cover 43 will be at one side of the center of the burner below the pan so that the heat arising from the burner will not strike upon the cover.

I claim as my invention:

1. In a device of the class described, the combination of a pan, a stirrer block rotatably mounted in the bottom of the pan and stirrer arms carried thereby, a rotatable shaft supported above the pan and capable of movement toward and from said stirrer block, means for detachably connecting said shaft with the stirrer block whereby the rotation of the shaft will turn the block with it, for the purposes stated.

2. In a device of the class described, the combination of a pan having a central depression in its bottom, a stirrer block rotatably mounted in said depression, straight flexible stirrer arms fixed to the block and in position close to the bottom of the pan, means for yieldingly holding the stirrer block downwardly, a rotatable shaft above the pan and capable of movement toward and from the block, and means for detachably connecting it with the block.

3. In a device of the class described, the combination of a pan, a stirrer block rotatably centrally mounted on the bottom of the pan, a bolt extended through the block and through the pan, a spring on said bolt, to yieldingly hold the block toward the pan, stirrer arms carried by the block, a shaft mounted above the block and capable of movement toward and away from the block, and means for detachably connecting the shaft and the block whereby the rotation of the shaft will turn the block with it.

4. A device of the class described, comprising a pan having a central circular depression in its bottom, a stirrer block rotatably mounted in said depression and extended above the bottom of the pan, said block having a recess at its central portion and two lugs at its top, a headed bolt extended downwardly through the recess in the block and through the lower part of said block and the bottom of the pan and having a nut at its lower end, a head on the upper end of said bolt, a spring interposed between the said head and the block to yieldingly hold the block downwardly, two straight flexible stirrer arms fixed to the block and designed to stand close to the bottom of the pan, a vertically movable rotatable shaft above the pan, and a cross bar on said shaft to engage the lugs on top of the block, for the purposes stated.

5. A device of the class described, comprising a pan, a stirring device mounted within the pan, a shaft slidingly mounted above the pan capable of vertical movement, means for rotating the shaft when in any position of its vertical movement, a supporting bearing for said shaft fixed against longitudinal movement with relation to said shaft having a vertically arranged slot at its lower end and a transverse slot at the top of the vertically arranged slot, a collar rotatably mounted on the shaft, below said upper means for preventing longitudinal movement of the collar on the shaft, said collar being provided with an arm extended outwardly, and a handle on said arm, said parts being so arranged that when the shaft is moved upwardly the arm will enter the vertical slot in the bearing and the handle may then be turned laterally so that the arm will enter the transverse slot and thus support the shaft in an elevated position, and means for detachably connecting the lower end of the shaft with the stirring device.

6. A device of the class described, comprising a pan, a stirring device mounted in the pan, a power shaft, a swinging bracket, a shaft mounted in the swinging bracket and arranged vertically, means for operatively connecting the power shaft with the vertically arranged shaft when the latter is in any position of its up and down movement, an arm fixed to said bracket, a spring actuated slide bolt carried by said arm, a stationary sector to be engaged by said slide bolt for supporting the shaft in different positions of its swinging movement, and means for detachably connecting the upright shaft with the stirring device, for the purposes stated.

7. In a device of the class described, the combination of a pan, a stirring device mounted in the pan, a power shaft, a beveled gear wheel thereon, a bracket capable of swinging movement and provided with a bearing extended downwardly from it, the lower end of said bearing being provided with a circular recess and also with a vertical slot at one side and a transverse slot at the top of the vertical slot, a shaft slidingly mounted in said bearing and provided with a longitudinal groove, a beveled gear wheel on said shaft in mesh with the aforesaid beveled gear wheel and provided with a pin to enter the groove in the shaft, a collar rotatably mounted on the shaft, an arm extended outwardly from the collar and a handle fixed to said arm, two stationary collars above and below said collar, an arm fixed to said bracket, a spring actuated slide bolt in said arm, and a stationary sector to be engaged by said slide bolt, and means for detachably connecting the lower end of said shaft with the stirring device.

8. A device of the class described, comprising a pan, a stirring device mounted in the pan, a power shaft, a swinging bracket, a shaft mounted in the swinging bracket and arranged vertically, means for operatively connecting the power shaft with the vertically arranged shaft when the latter is in any position of its up and down movement, an arm fixed to said bracket, a spring actuated slide bolt carried by said arm and a stationary sector to be engaged by said slide bolt for supporting the shaft in different positions of its swinging movement, and means for detachably connecting the upright shaft with the stirring device, for the purposes stated.

Des Moines, Iowa, March 25, 1910.

REUBEN O. STUTSMAN.

Witnesses:
MARY WALLACE,
MILDRED B. GOLDIZEN.